US009606966B2

United States Patent
Kalyanaraman et al.

(10) Patent No.: US 9,606,966 B2
(45) Date of Patent: Mar. 28, 2017

(54) ENERGY AND EFFORT EFFICIENT READING SESSIONS

(71) Applicant: International Business Machines Corporation, Armonk, NY (US)

(72) Inventors: Rajesh Kalyanaraman, Bangalore (IN); Senthil K. Venkatesan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 14/332,460

(22) Filed: Jul. 16, 2014

(65) Prior Publication Data

US 2016/0019186 A1 Jan. 21, 2016

(51) Int. Cl.
G06F 3/048 (2013.01)
G06F 17/21 (2006.01)
G06F 3/0485 (2013.01)
G06F 3/0483 (2013.01)
G09G 5/34 (2006.01)
G09G 3/34 (2006.01)

(52) U.S. Cl.
CPC .......... *G06F 17/211* (2013.01); *G06F 3/0483* (2013.01); *G06F 3/0485* (2013.01); *G09G 3/3406* (2013.01); *G09G 5/34* (2013.01); *G09G 2310/04* (2013.01); *G09G 2330/021* (2013.01); *G09G 2330/022* (2013.01)

(58) Field of Classification Search
CPC .............................. G06F 3/0485; G06F 17/211
See application file for complete search history.

(56) References Cited

U.S. PATENT DOCUMENTS

| | | | |
|---|---|---|---|
| 6,930,671 B2 | 8/2005 | Choi | |
| 8,060,836 B2 | 11/2011 | Duarte | |
| 2009/0138815 A1 | 5/2009 | Mercer | |
| 2009/0327950 A1 | 12/2009 | Kuo | |
| 2010/0125807 A1* | 5/2010 | Easterday | G06F 3/0485 715/785 |
| 2011/0119620 A1 | 5/2011 | Schön et al. | |
| 2012/0054672 A1* | 3/2012 | McDowell | G09B 17/003 715/784 |
| 2013/0031507 A1 | 1/2013 | George | |
| 2013/0339830 A1 | 12/2013 | Yuan et al. | |

OTHER PUBLICATIONS

Anonymous, "Mobile Table Navigation Enhancement", IP.com, Oct. 5, 2011, p. 1-4, IPCOM000211464D.
Anonymous, "Method for Scrolling Large Remote Documents with Scroll Profiles", IP.com, Aug. 30, 2013, p. 1-4, IPCOM000230665D.

(Continued)

*Primary Examiner* — Peiyong Weng
(74) *Attorney, Agent, or Firm* — Erik K. Johnson (57) ABSTRACT

Embodiments of the present invention disclose a method, computer program product, and system for presenting text and figures on a display screen. Formatting, by a computer, text in a document into a single display line, scrolling the single display line on a first portion of the display screen, wherein the display screen remains active, and displaying, on a second portion of the display screen, figures in the document referenced by the scrolled text in the single display line on the display screen.

11 Claims, 7 Drawing Sheets

(56) References Cited

OTHER PUBLICATIONS

Anonymous, "A Method of Scrolling Position Assistant", IP.com, Jan. 3, 2014, p. 1-4, IPCOM000233943D.
Fitchett et al, "Evaluating Reading and Analysis Tasks on Mobile Devices: A Case Study of Tilt and Flick Scrolling", OZCHI '09, Nov. 23-27, 2009, p. 225-232, Melbourne, Australia.
Spritz Inc, "The Science", Accessed on Mar. 31, 2014, p. 1-4, http://www.spritzinc.com/the-science/.
IBM: List of IBM Patents or Patent Applications Treated as Related (Appendix P), Feb. 26, 2015.
Kalyanaraman et al., "Energy and Effort Efficient Reading Sessions", U.S. Appl. No. 14/631,896, filed Feb. 26, 2015, 32 pages.

\* cited by examiner

ENERGY AND EFFORT EFFICIENT READING SESSIONS

BACKGROUND

The present disclosure relates generally to presentation processing of documents and more particularly to energy and effort efficient document presentation.

Computing device display screens use many different technologies to present information on the display screen. Some computing device display screens may utilize non-light emitting technologies, such as liquid-crystal displays (LCD), in which the liquid crystals are arrayed in front of a backlight to produce images. Other computing device display screens may utilize technologies in which specific pixels of the display emit light, on demand, in response to an electric current. Exemplary computing device display screens with pixels that emit light on demand are light emitting diode (LED) devices, with semiconductor light sources, illuminated by the movement of electrons in a semiconductor material; organic light-emitting diode (OLED) devices, which are LED devices in which the emissive electroluminescent layer is a film of organic compound which emits light in response to an electric current; plasma devices, which utilize small cells containing electrically charged ionized gases; and quantum dots (QD), with semiconductor nanocrystals which emit light on demand.

SUMMARY

Embodiments of the present invention disclose a method, computer program product, and system for presenting text and figures on a display screen. Formatting, by a computer, text in a document into a single display line, scrolling the single display line on a first portion of the display screen, wherein the display screen remains active, and displaying, on a second portion of the display screen, figures in the document referenced by the scrolled text in the single display line on the display screen.

In another aspect, saving, by the computer, a document text location of the scrolled single display line, terminating the scrolling of the single display line, and displaying, on the display screen, a portion of the document that includes document text from the saved document text location.

In another aspect, receiving, by the computer, an interrupt. Saving the state of the first and second portion of the display screen, processing the interrupt, and responsive to completing the interrupt processing, restoring the state of the first and second portion of the display screen.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Reading a document on a computing device display screen may become inconvenient as the length of a document increases and a reader must scroll to sections of the document that are not currently displayed. Depending on the presentation of the document, scrolling may include side-to-side scrolling as well as up-and-down scrolling. The smaller the display screen, such as on tablets and mobile phones, the greater the need for scrolling.

In addition, many computing devices may not be able to differentiate between display inactivity, due to document read time, versus inactivity due to an idle device, and may attempt to save power on the device by dimming the display, turning off the display, initiating a screen saver, or otherwise making the document unreadable. A reader may be forced to periodically create an interrupt, for example by touching the screen, to notify the computing device that the device should not be deemed idle. Either of the above scenarios may disturb a reader's concentration and reading experience.

These and other shortcomings in the prior art are addressed by embodiments of the present disclosure. Various embodiments may present a document as a scrolling stream of text and figures in a single display line, utilizing only a limited portion of the display screen area. Certain embodiments may reduce power usage to the display screen while a document is presented as a single display line, by turning off portions of the display screen that are not used for the single display line. The reduced power usage may prolong the battery life in a mobile computing device.

Figure 1:
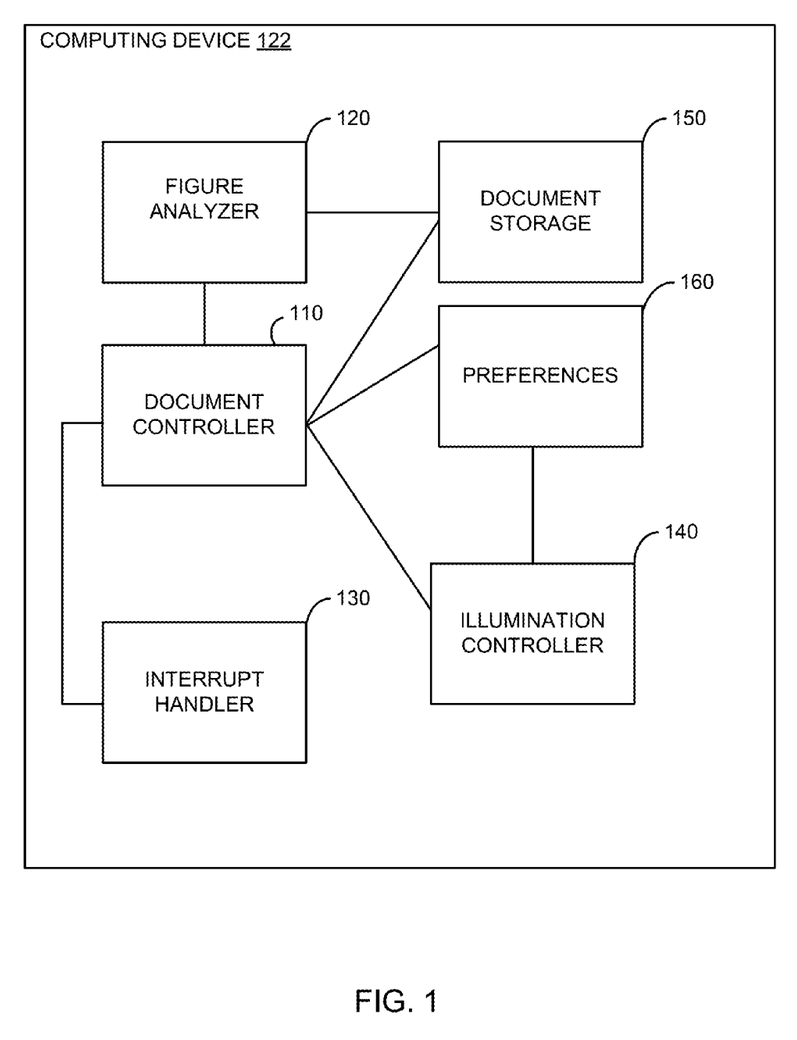
FIG. 1 illustrates a functional block diagram of an exemplary computing device, in accordance with an embodiment of the disclosure.

FIG. 1 illustrates a functional block diagram of an exemplary computing device 122, in accordance with an embodiment of the disclosure. Computing device 122 may include a document controller 110, document storage 150, a figure analyzer 120, an illumination controller 140, preferences 160, and an interrupt handler 130, all of which may be stored, for example, on a computer readable storage medium, such as computer readable storage medium (media) 730 (FIG. 7), portable computer readable storage medium (media) 770, and/or RAM(S) 722.

Computing device 122 represents a computing device, system or environment, and may be a laptop computer, notebook computer, personal computer (PC), desktop computer, tablet computer, thin client, mobile phone or any other electronic device or computing system capable of performing the required functionality of embodiments of the disclosure. Computing device 122 may include internal and external hardware components, as depicted and described in further detail with respect to FIG. 7. In other various embodiments of the present disclosure, computing device 122 may represent a computing system utilizing clustered computers and components to act as a single pool of seamless resources. In general, computing device 122 is representative of any programmable electronic devices or combination of programmable electronic devices capable of executing machine-readable program instructions in accordance with an embodiment of the disclosure.

In various embodiments, the computing device 122 may provide an option to present a document on its display screen as a scrolling stream of text and figures in a single display line. In various embodiments, a touch, gesture, or key input may be used to switch between a standard document display and a streamed single display line of text and figures. In certain embodiments, both a streamed single display line and a standard document display may be simultaneously displayed on the computing device 122 display screen. The touch, gesture, or key input controlling the display format switch may be configurable, and stored in preferences 160.

In various embodiments, document controller 110 may receive a request to present a document stored in document storage 150, hereinafter "original document", as a streaming single line display of text and figures. The original document may be a downloaded document, stored in document storage 150, which includes document control tags, such as XML, HTML, or Microsoft® Word tags, used to format and display the original document. Document controller 110 may pass control to figure analyzer 120 to identify any figures, including, but not limited to, objects, drawings, tables, charts, and graphics, in the original document, and to link those figures to the text that references them in the original document. Document controller 110 may then reformat the original document into a single stream of text and referenced figures, hereinafter "converted document," beginning at the top of the document and continuing to the bottom. In various embodiments, document controller 110 may strip, for example, all control tags, format tags, figures, and style tags from the original document while reformatting it into the converted document, leaving only the text and links to the saved figures in the converted document. Document controller 110 may then present the converted document as an unformatted streaming single line of text and referenced figures. In certain embodiments, document controller 110 may leave certain text formatting, for example, bold, font, and italics, from the original document in the converted document, in order to display the text in the same format as the original document.

In various embodiments, figure analyzer 120 may identify figures in the original document by utilizing the control and format tags in the original document, for a document that includes control and format tags. Figure analyzer 120 may also use document tags, such as cross reference tags, to identify any text in the original document that references the identified figure. In certain embodiments, figure analyzer 120 may store an identified figure separately from the original document in document storage 150, and insert a link into the original document that document controller 110 may use when reformatting the original document into a converted document, to ensure the figure is presented with its referencing text on the display screen.

In various embodiments, for an original document without control tags that cross reference figures and text, figure analyzer 120 may analyze the text in the original document, recognizing textual references in the document to the identified figure, such as textual references to a number or name in the figure caption. Figure analyzer 120 may link the recognized text to the identified figure for document controller 110.

In certain embodiments, figure analyzer 120 may link a figure, without any identifiable referencing text, to the text at the beginning of the page in the original document that includes the figure. In other embodiments, figure analyzer 120 may link a figure, without any identifiable referencing text, to the text at the beginning of the paragraph in the original document that includes the figure. In certain other embodiments, figure analyzer 120 may link a figure, without any identifiable referencing text, to the text in the original document just prior to the included figure. In various embodiments, the rules for linking a figure without any identifiable referencing text may be configurable and stored in preferences 160. In various embodiments, figure analyzer 120 may convert the format, resize, change resolution or compress the figures as required.

Figure 2:
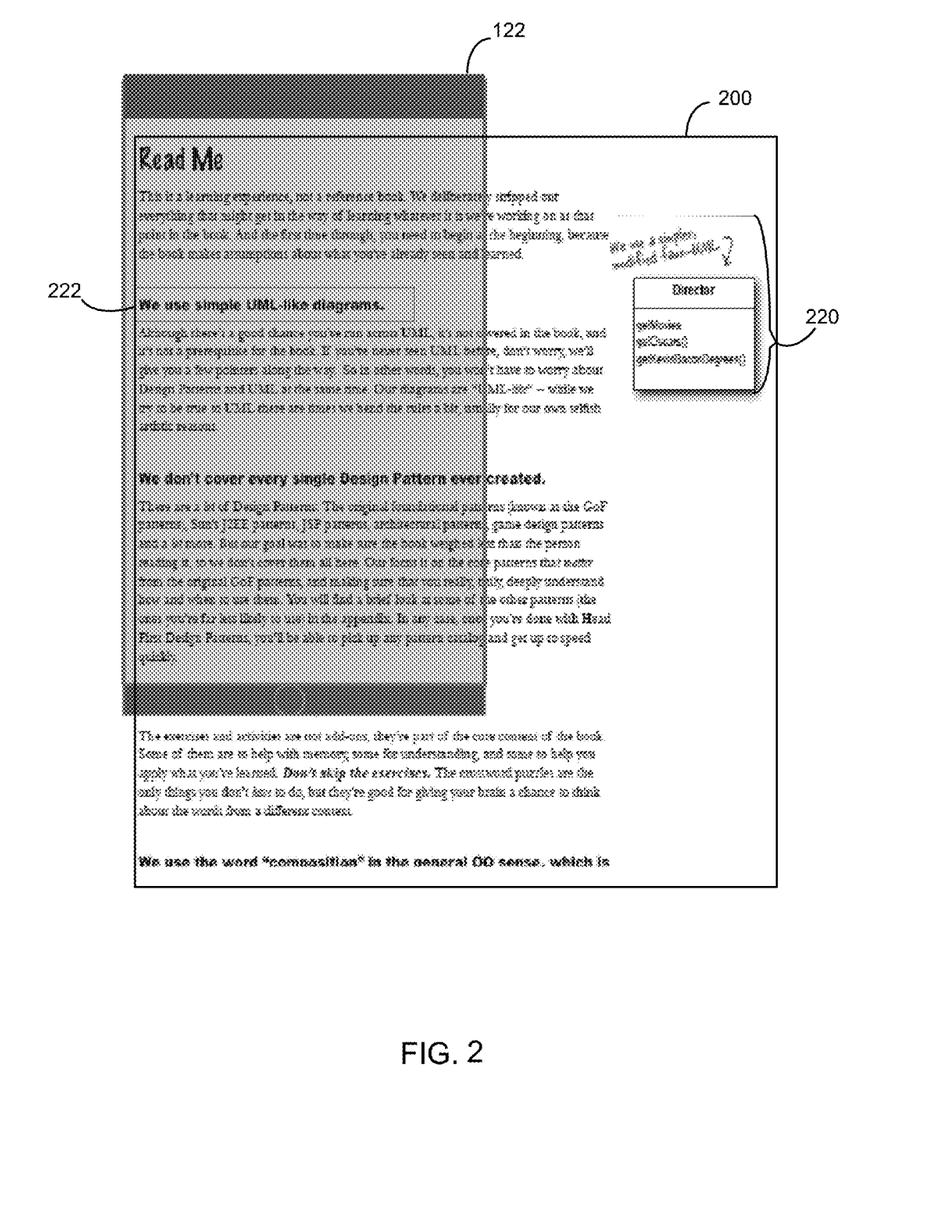
FIG. 2 depicts an exemplary document presented on a computing device display screen.

FIG. 2 depicts an exemplary document 200 presented on a computing device 122, for example, a mobile phone or other mobile computing device. The exemplary document 200, shown as a standard document display, illustrates the portion of the document 200 that may fit on the display screen of a computing device 122. In the exemplary embodiment, the document, as presented, may need to be scrolled, both left and right and up and down, for the entire document to be read. Exemplary document 200 includes a FIG. 220 with referencing text 222.

Figure 3A:
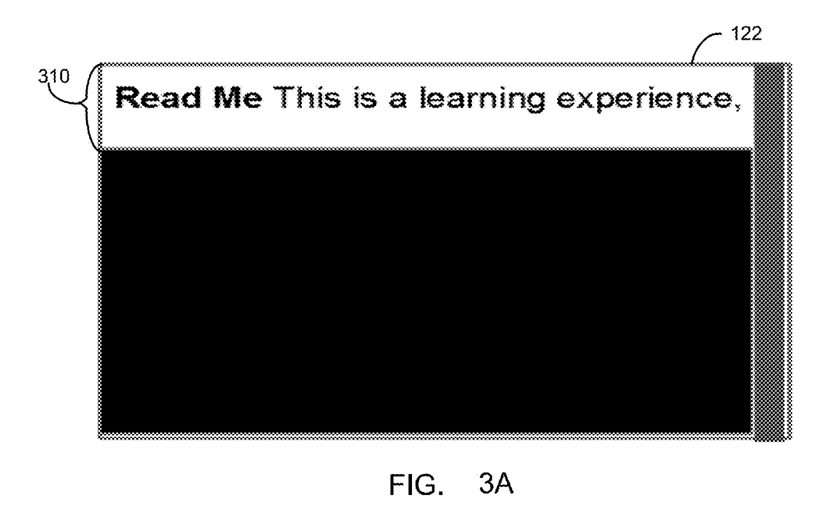
FIG. 3A depicts an exemplary document presented on a computing device display screen as a stream of text, in accordance with an embodiment of the disclosure.

FIG. 3A depicts the exemplary document 200 presented on a computing device 122 display screen as a stream of text, in accordance with an embodiment of the disclosure. In the exemplary embodiment, text from the exemplary document 200 is depicted as a single display line of streaming text in an exemplary text display area 310 on the display screen of computing device 122. Various embodiments may allow the text display area 310 to be resized and relocated to other locations on the computing device 122 display screen. The exemplary single display line of text may stream right to left, left to right, up to down, or down to up, across the text display area 310. Since various languages are read in a variety of directions, the direction of text streaming may be configured and stored in preferences 160. In certain embodiments, the direction of text streaming may be temporarily modified, for example to re-display text recently scrolled off the text display area 310. In certain embodiments, the touch, gesture, or key input controlling a temporary text streaming direction change may be configurable and stored in preferences 160.

Figure 3B:
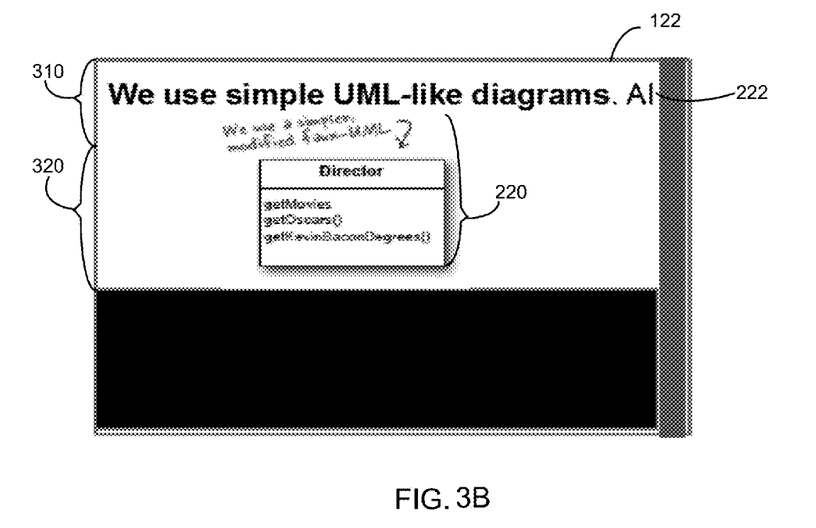
FIG. 3B depicts an exemplary document presented on a computing device display screen as a stream of text with a referenced figure, in accordance with an embodiment of the disclosure.

FIG. 3B depicts the exemplary document 200 presented on a computing device 122 display screen as a stream of text with the referenced FIG. 220, in accordance with an embodiment of the disclosure. In the exemplary embodiment, the top of the figure display area 320 is directly below the bottom of the text display area 310. Various embodiments may allow the figure display area 320 to be resized and relocated to other locations on the computing device 122 display screen. Exemplary FIG. 220 is displayed along with its referencing text 222. In various embodiments, document controller 110 may open and close the figure display area 320 as figures are referenced in the text display area 310.

Returning to FIG. 1, document controller 110 may maintain parallel pointers into the original document, in document storage 150, and the converted document, corresponding to the text being displayed in the text display area 310 of the display screen. In various embodiments, document controller 110 may save these pointers when the presentation of the single display line of text is paused or stopped, or when the text display area 310 is closed. Document controller 110 may resume the single display line streaming using the saved pointers to resume streaming at the text position where the streaming was paused, stopped, or the text display area 310 was closed. In certain embodiments, the touch, gesture, or key input controlling a pause, stop, resume, and text display area close may be configurable and stored in preferences 160.

In certain embodiments, document controller 110 may switch the presentation of the document between a streamed, single display line and a standard document display. In various embodiments, document controller 110 may switch to a standard document display, using the parallel pointers to locate and display the portion of the original document that includes the text that was being displayed in the text display area 310 when the display format switch occurred. In certain embodiments, document controller 110 may enhance the text in the standard document display, which corresponds to the text that was displayed in the text display area 310 when the display format switch occurred, for example, by highlighting, enlarging, or bolding the corresponding text. In certain embodiments, document controller 110 may pause the single display line streaming in the text display area 310 on a display format switch and open a simultaneous standard document display on another portion of the display screen, such that the text in the text display area 310 may be viewed, in context, in the original document displayed in the standard document display.

Figure 4A:
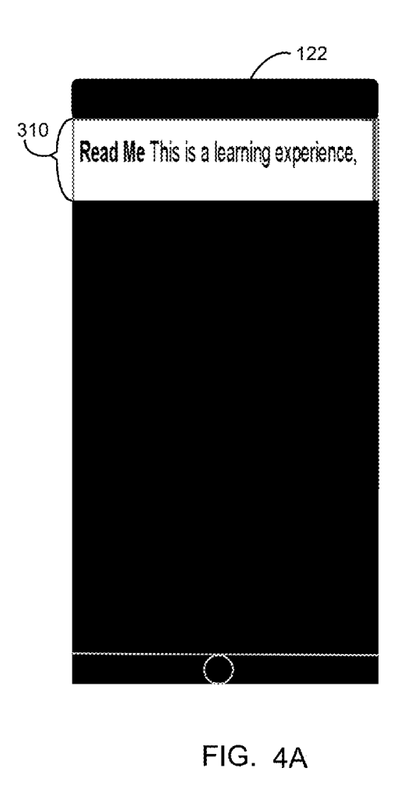
FIGS. 4A and 4B illustrate an exemplary display format switch from a single display line to a document display, in accordance with an embodiment of the disclosure.
Figure 4B:
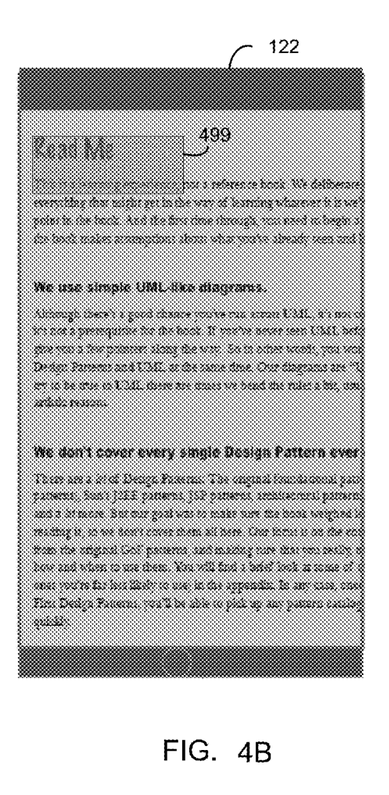

FIGS. 4A and 4B illustrate an exemplary display format switch from a single display line to a standard document display, in accordance with an embodiment of the disclosure. FIG. 4A depicts exemplary computing device 122 presenting the exemplary document 200 as a single display line stream of text on its display screen. The exemplary stream of text in the text display area 310 represents the text displayed in the text display area 310 when document controller 110 receives a display format switch interrupt.

FIG. 4B depicts exemplary computing device 122 presenting the exemplary document 200 in a standard document display after a display format switch. Computing device 122 displays the portion of the exemplary document 200 that includes the exemplary text that was in the text display area 310 at the time of the display format switch. Document controller 110 may enhance that exemplary text, as depicted by enhancement 499.

Returning to FIG. 1, document controller 110 may, in various embodiments, present the converted document using document display preferences stored in preferences 160. Document display preferences, stored in preferences 160, may include, but are not limited to, display area characteristics, such as text display area 310 screen dimensions, screen orientation, text display area 310 location on the computing device 122 display screen, text size, text color, text display area 310 background color, figures display area 320 screen dimensions, figures display area 320 location on the computing device 122 display screen, figures to text linking rules, text streaming speed, and text streaming direction. In certain embodiments, document display preferences, in preferences 160, may be pre-set with default values. In other embodiments, document display preferences may be configurable, and stored in preferences 160.

In certain embodiments, document display preferences may be temporarily overwritten with a touch, gesture, or key input. For example, a gesture that enlarges the text display area 310 screen dimensions may also enlarge the text size. Other exemplary document display preferences that may be temporarily overwritten include text display area 310 location, text streaming speed, figure display area 320 location, and figure display area 320 screen dimensions. In certain embodiments, document controller 110 may discard the overwritten document display preferences when the text or figure display area 310, 320 is closed. In other embodiments, document controller 110 may store any overwritten document display preferences with the original document, in document storage 150, such that document controller 110 may present the same document, in the future, with the overwritten document display preferences. In various embodiments, the touch, gestures, and key inputs that may be used to overwrite the document display preferences may be configurable and stored in preferences 160.

In various embodiments, document controller 110 may close the text display area 310 after it has streamed the last of the single line of text through the text display area 310. In other embodiments, document controller 110 may leave the text display area open until a touch, gesture, or key input is received to close the text display area 310.

Certain embodiments may provide an optional energy saving mode. In energy saving mode, document controller 110 may signal illumination controller 140 to turn off or dim the lighting for any areas of the computing device 122 display screen not being used for document presentation, in order to save energy, and prolong battery life for a mobile device. In various energy saving mode embodiments, document controller 110 may present a figure as a preview or a thumbnail in the text display area 310 instead of in a separate figure display area 320. In certain embodiments a touch, gesture, or key input may open a figure display area 320 for the previewed figure. In certain embodiments, a figure display area 320 may temporarily illuminate to display a figure. In various embodiments, the figure presentation options and energy saving options may be configurable and stored in preferences 160.

In various embodiments, illumination controller 140 may receive a signal from document controller 110 to either illuminate or turn off portions of the computing device 122 display screen. Illumination controller 140 may determine whether backlighting or light emitting pixels (such as LED) illuminate the display screen of computing device 122. For a computing device 122 display screen with pixels that emit light in response to electric current, illumination controller 140 may, in various embodiments, turn off the specified display screen portions by defining the background color of those portions as "black", thus turning off any electric current to the pixels and saving energy. In other embodiments in which the computing device 122 display screen may be equipped with programmable backlights illuminating the display screen, illumination controller 140 may turn off the specified portions of the display screen by turning off appropriate backlights. For example, U.S. Pat. No. 6,930,671 B2, dated Aug. 16, 2005, by Kyu-Don Choi, titled "Method for Dynamically Lightening Backlights of Mobile Communications Terminal," describes a method for controlling backlights of a mobile communications terminal individually by allocating and coupling a general purpose input output (GPIO) to each backlight of the mobile communications terminal in one-by-one manner in order to provides various backlight emitting modes according to user operations of the mobile communications terminal and in order to reduce power consumption to emit the backlight.

In various embodiments, an interrupt handler 130 may receive control when an external interrupt, such as an incoming call, text, tweet, etc., occurs. In various embodiments, interrupt handler 130 may, for example, read the short messaging service (SMS) data for an incoming call. Interrupt handler 130 may limit the amount of the incoming call's caller details displayed and may limit the portion of the display screen illuminated, if the computing device 122 is in an energy saving mode. In various embodiments, interrupt handler 130 may utilize the text display area 310 to display information related to the interrupt, rather than utilizing the entire display screen. Certain other embodiments may include a configurable display area, defining a portion of the computing device 122 display screen, to utilize for displaying the interrupt, if a text display area 310 is not open.

In various embodiments, interrupt handler 130 may notify document controller 110 to pause or stop streaming the single display line of text. Interrupt handler 130 may display the interrupt details, text message, etc. in the text display area 310 already illuminated for document controller 110, instead of lighting the entire computing device 122 display screen. In certain embodiments, interrupt handler 130 may re-position, re-size, and reduce the amount of information and controls normally displayed with an interrupt, in order to save energy and utilize only the text display area 310, to alert the reader of the interrupt. In certain embodiments with an energy saving display area configured, the re-positioned, re-sized, and reduced information and controls may be displayed in the configured area. In certain embodiments, interrupt handler 130 may notify document controller 110, when the interrupt completes, for example, the phone call disconnects. Document controller 110 may then resume the presentation of streaming text. In certain embodiments, document controller 110 may reload the text display area 310 and remain in a pause state, waiting for a touch, gesture, or key input to resume streaming the text.

Figure 5:
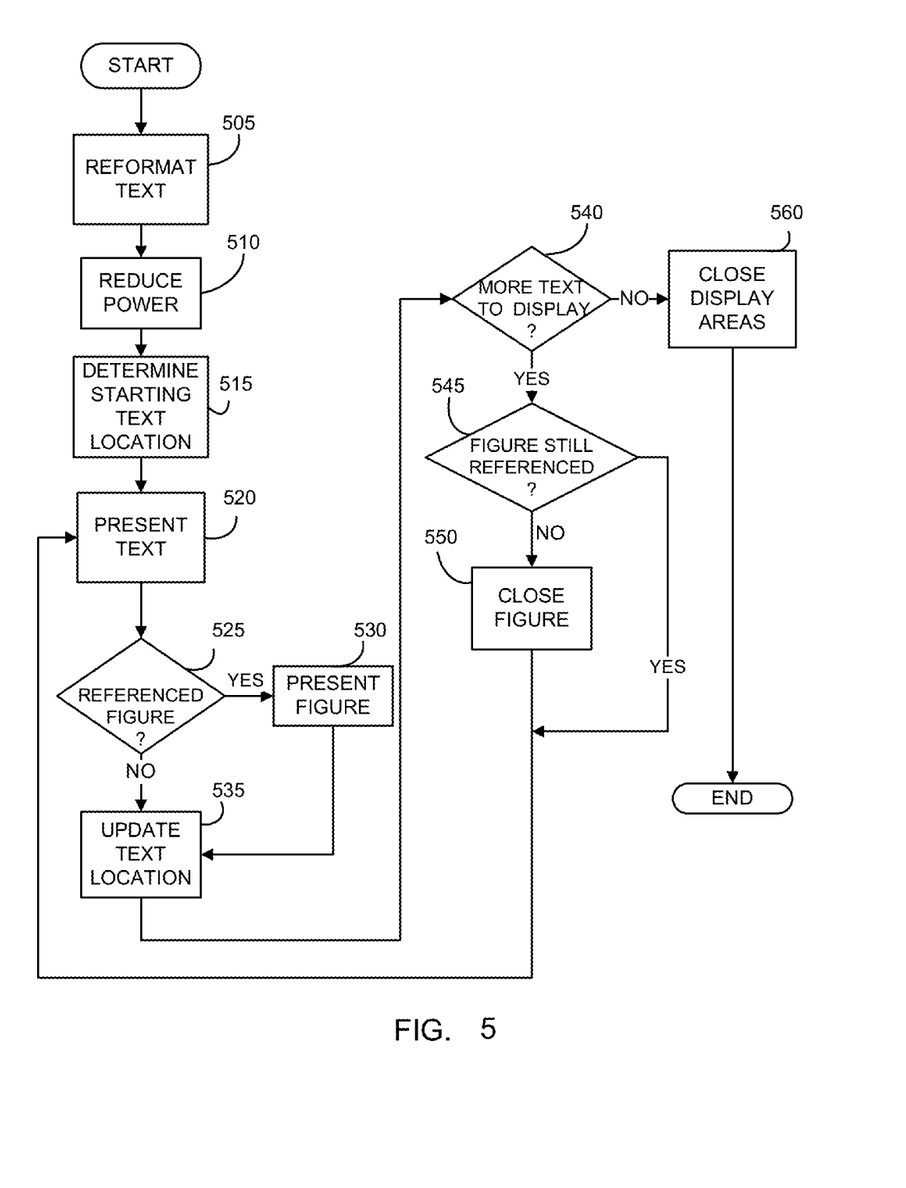
FIG. 5 is a flowchart illustrating the operation of document controller presenting a document as a streaming single display line of text, in accordance with an embodiment of the disclosure.

FIG. 5 is a flowchart illustrating the operation of document controller 110 presenting a document as a streaming single display line of text, in accordance with an embodiment of the disclosure. After receiving a request to present a document for reading as a streaming single display line of text, document controller 110 may, in various embodiments, reformat, at 505, the requested document into a single line of text.

In order to conserve energy while the document is read, document controller 110 may signal illumination controller 140, which may at 510, turn off the power that illuminates the portions of the computing device 122 display screen not used for reading the streaming single display line of text.

Document controller 110 may determine, at 515, whether the document is being read from the beginning or is being resumed. When reading from the beginning, document controller 110 may locate the beginning of the converted document. When resuming from a saved text location in the converted document, saved when the presentation of the single display line of text was paused or stopped, or when the text display area 310 was closed, document controller 110 may locate the text within the converted document. Document controller 110 may, at 520, fill the text display area 310 with a portion of the single line of text, starting at the text location determined at 515. Document controller 110 may determine the size and location for the text display area 310 on the computing device 122 display screen, from values saved in preferences 160. Document controller 110 may establish the text display area 310 with the text size, text color, and background color values saved in preferences 160.

If document controller 110 determines, at 525, that the portion of the single line of text in the text display area 310 references a figure, document controller 110 may establish a figure display area 320, and if necessary, signal illumination controller 140 to turn power on to the portions of the computing device 122 display screen that illuminate the figure display area 320. Document controller 110 may determine the size and location on the computing device 122 display screen for the figure display area 320 from values saved in preferences 160. Document controller 110 may, at 530, load the referenced figure into the figure display area 320.

Document controller 110 may, at 535, update the text location in the single line of text in order to stream the text. If document controller 110 determines, at 540, that there is no additional text to stream, document controller 110 may, at 560, close the text display area 310 and the figure display area 320, if necessary, and signal illumination controller 140 to illuminate the computing device 122 display screen. Document controller 110 processing may then end.

If, at 540, document controller 110 determines there is additional text to stream, document controller 110 may determine if the figure displayed in the figure display area 320, if any, is still referenced by the updated text location. For a figure that is no longer referenced by the updated text, as determined at 545, document controller 110 may, at 550, close the figure display area 320 and if necessary, signal illumination controller 140 to turn off the power to the portion of the computing device 122 display screen that illuminated the figure display area 320. Document controller 110 may, at 520, again fill the text display area 310 with a portion of the single line of text, starting with the updated text location.

Figure 6:
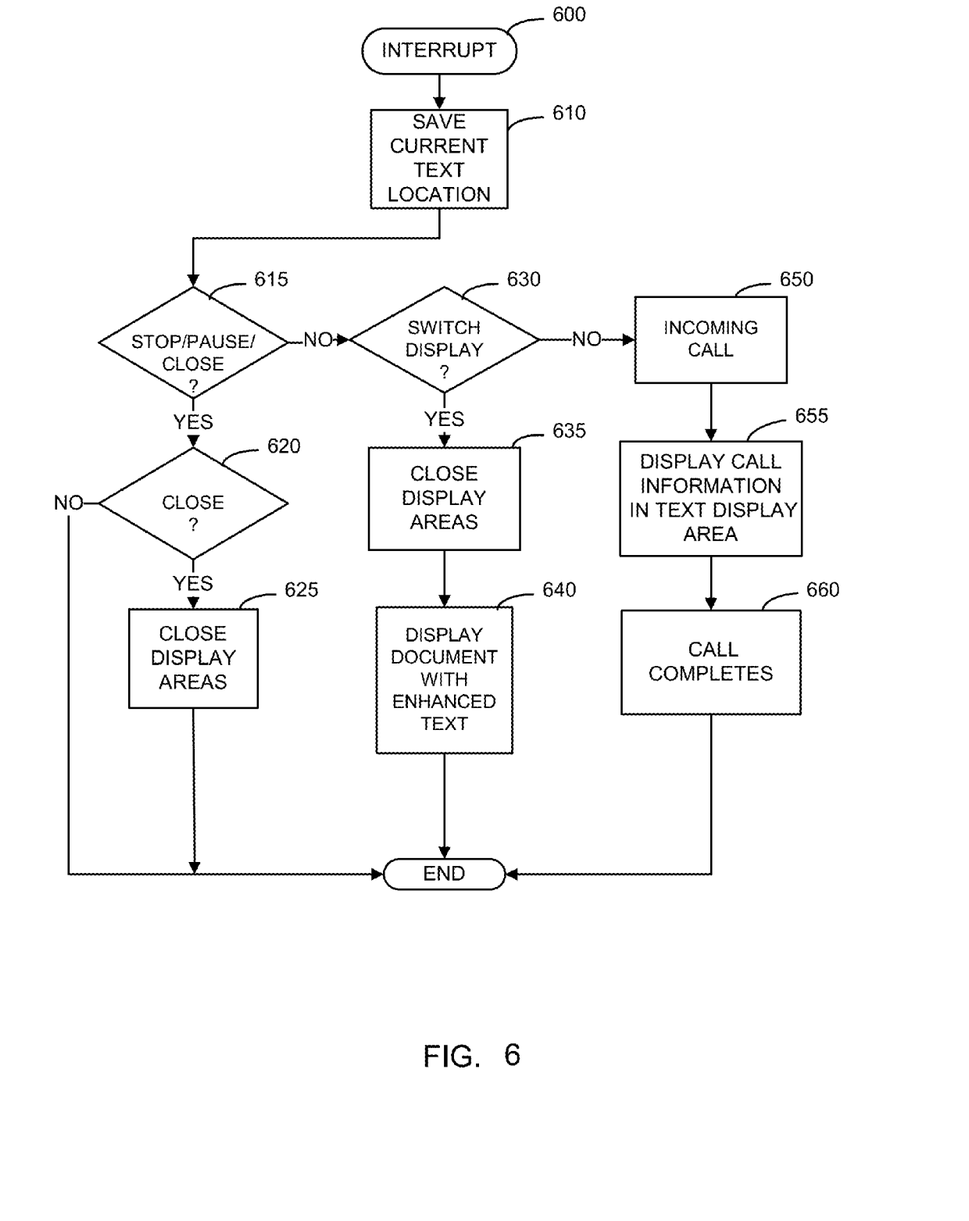
FIG. 6 is a flowchart illustrating interrupt handling by document controller and interrupt handler, in accordance with an embodiment of the disclosure.

FIG. 6 is a flowchart illustrating interrupt handling by document controller 110 and interrupt handler 130, in accordance with an embodiment of the disclosure. Various interrupts may occur while document controller 110 is streaming the single display line in the text display area 310. Interrupts may include a reader interrupt, such as a pause of the stream of text, a stop of the stream of text, a close of the text display area 310, and a display format switch to a standard document display, and an external interrupt, such as a receipt of an incoming call, text. tweet, etc. When an interrupt occurs, at 600, document controller 110 may, at 610, stop streaming the text in the text display area 310 and save the text location, of the displayed text, in the converted document and original document for later use. The location, in the converted document and original document may be saved, by document controller 110, with the original document in document storage 150 and with the converted document. The saved text location may be used when document controller 110 resumes streaming the text.

If the interrupt is determined, by document controller 110, to be a user initiated stop or pause, at 615, document controller 110 has already stopped or paused the streaming text. If the interrupt is determined to be a user initiated close of the text display area 310, as determined at 620, document controller 110 may, at 625, close the text display area 310 and the figure display area 320, if necessary, and signal illumination controller 140 to illuminate the computing device 122 display screen. Document controller 110 processing may then end.

If the interrupt is determined, by document controller 110, to be a user initiated display format switch, at 630, document controller 110 may, at 635, close the text display area 310 and the figure display area 320, if necessary, and signal illumination controller 140 to illuminate the computing device 122 display screen. Document controller 110 may switch to a standard document display, at 640, displaying the portion of the document that includes the text that was being displayed in the text display area 310 when the display format switch interrupt occurred. Document controller 110 may enhance the text that corresponds to the text that was displayed in the text display area 310 when display format switch interrupt occurred. After switching the display to a standard document display, document controller 110 may end its streaming single display line processing.

If the interrupt, at 650, is an incoming call/text/tweet/etc., interrupt handler 130 may display, at 655, the interrupt details, text message, etc. in the text display area 310 already illuminated for document controller 110, in order to save energy, instead of illuminating the entire computing device 122 display screen. Interrupt handler 130 may re-position, re-size, and reduce the amount of information and controls normally displayed with an interrupt, in order to utilize the text display area 310. Interrupt handler 130 may notify document controller 110, at 660, when the interrupt completes, for example, the phone call disconnects. Document controller 110 may then resume the document presentation from the saved stopping point.

Figure 7:
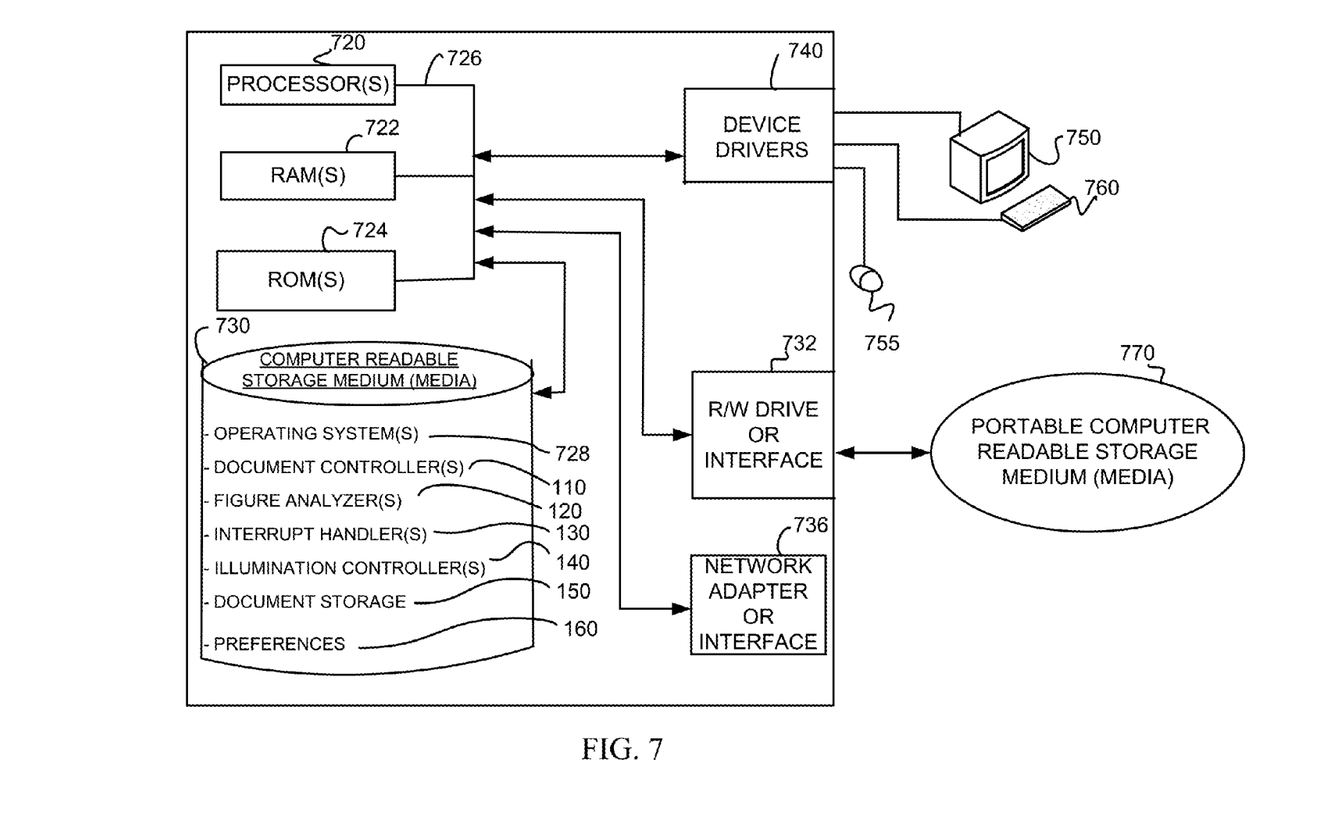
FIG. 7 depicts a block diagram of components of a computing device, in accordance with an embodiment of the disclosure.

FIG. 7 depicts a block diagram of components of computing device 122 of FIG. 1, in accordance with an embodiment of the disclosure. It should be appreciated that FIG. 7 provides only an illustration of one implementation and does not imply any limitations with regard to the environments in which different embodiments may be implemented. Many modifications to the depicted environment may be made.

Computing device 122 can include one or more processors 720, one or more computer-readable RAMs 722, one or more computer-readable ROMs 724, one or more computer readable storage medium 730, device drivers 740, read/write drive or interface 732, and network adapter or interface 736, all interconnected over a communications fabric 726. Communications fabric 726 can be implemented with any architecture designed for passing data and/or control information between processors (such as microprocessors, communications and network processors, etc.), system memory, peripheral devices, and any other hardware components within a system.

One or more operating systems 728, document controllers 110, figure analyzers 120, interrupt handlers 130, illumination controllers 140, document storage 150, and preferences 160 are stored on one or more of the computer-readable storage medium 730 for execution by one or more of the processors 720 via one or more of the respective RAMs 722 (which typically include cache memory). In the illustrated embodiment, each of the computer readable storage medium 730 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage medium that can store a computer program and digital information.

Computing device 122 can also include a R/W drive or interface 732 to read from and write to one or more portable computer readable storage medium 770. Document controller 110, figure analyzer 120, interrupt handler 130, illumination controller 140, document storage 150, and preferences 160 can be stored on one or more of the portable computer readable storage medium 770, read via the respective R/W drive or interface 732, and loaded into the respective computer readable storage medium 730.

Computing device 122 can also include a network adapter or interface 736, such as a TCP/IP adapter card or wireless communication adapter (such as a 4G wireless communication adapter using OFDMA technology). Document controller 110, figure analyzer 120, interrupt handler 130, illumination controller 140, document storage 150, and preferences 160 can be downloaded to the computing device from an external computer or external storage device via a network (for example, the Internet, a local area network or other, wide area network or wireless network) and network adapter or interface 736. From the network adapter or interface 736, the programs are loaded into the computer readable storage medium 730. The network may comprise copper wires, optical fibers, wireless transmission, routers, firewalls, switches, gateway computers, and/or edge servers.

Computing device 122 can also include a display screen 750, a keyboard or keypad 760, and a computer mouse or touchpad 755. Device drivers 740 interface to display screen 750 for imaging, to keyboard or keypad 760, to computer mouse or touchpad 755, and/or to display screen 750 for pressure sensing of alphanumeric character entry and user selections. The device drivers 740, R/W drive or interface 732, and network adapter or interface 736 can comprise hardware and software (stored in computer readable storage medium 730 and/or ROM 724).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A computer program product for presenting text and figures on a display screen, the computer program product comprising one or more computer non-transitory readable storage medium and program instructions stored on at least one of the one or more computer readable storage medium, the program instructions comprising:
    program instructions to format, by a computer, text in a document into a single display line;
    program instructions to scroll the single display line on a first portion of the display screen, wherein the display screen remains active;
    program instructions to display, on a second portion of the display screen, figures in the document referenced by the scrolled text in the single display line on the display screen;
    program instructions to receive, by the computer, an interrupt, wherein the interrupt comprises a message from a separate device wherein the message comprises an element selected from the group consisting of: a call, a text message, an SMS, and a tweet;
    program instructions to save a state of the first and second portion of the display screen;
    program instructions to process the interrupt; and
    responsive to completing the interrupt processing, program instructions to restore the state of the first and second portion of the display screen.

2. The computer program product according to claim 1, further comprising:
    program instruction to save, by the computer, a document text location of the scrolled single display line;
    program instructions to terminate the scrolling of the single display line; and
    program instructions to display, on the display screen, a portion of the document that includes document text from the saved document text location.

3. The computer program product according to claim 1, further comprising program instructions to reduce power, by the computer, to portions of the display screen not displaying the single display line nor the referenced figures.

4. The computer program product according to claim 1, wherein scrolling direction of the single display line is user controlled, and wherein characteristics of the first and second portions of the display screen are user controlled.

5. The computer program product according to claim 2, wherein the computer program instructions enhance the display of the included document text.

6. The computer program product according to claim 1, wherein program instructions to process the interrupt further comprises:
- program instructions to format, by the computer, information related to the interrupt for display on the first portion of the display screen; and
- program instructions to display the information related to the interrupt on the first portion of the display screen.

7. A computer system for presenting text and figures on a display screen, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising:
- program instructions to format, by a computer, text in a document into a single display line;
- program instructions to scroll the single display line on a first portion of the display screen, wherein the display screen remains active;
- program instructions to display, on a second portion of the display screen, figures in the document referenced by the scrolled text in the single display line on the display screen;
- program instructions to receive, by the computer, an interrupt, wherein the interrupt comprises a message from a separate device wherein the message comprises an element selected from the group consisting of: a call, a text message, an SMS, and a tweet;
- program instructions to save a state of the first and second portion of the display screen;
- program instructions to process the interrupt; and
- responsive to completing the interrupt processing, program instructions to restore the state of the first and second portion of the display screen.

8. The computer system according to claim 7, further comprising:
- program instruction to save, by the computer, a document text location of the scrolled single display line;
- program instructions to terminate the scrolling of the single display line; and
- program instructions to display, on the display screen, a portion of the document that includes document text from the saved document text location.

9. The computer system according to claim 7, further comprising program instructions to reduce power, by the computer, to portions of the display screen not displaying the single display line nor the referenced figures;
- instructions to compress the data from the one or more nodes of the first computer system, in accordance with the received indication of the compression algorithm.

10. The computer system according to claim 7, wherein scrolling direction of the single display line is user controlled, and wherein characteristics of the first and second portions of the display screen are user controlled.

11. The computer system according to claim 7, wherein program instructions to process the interrupt further comprises:
- program instructions to format, by the computer, information related to the interrupt for display on the first portion of the display screen; and
- program instructions to display the information related to the interrupt on the first portion of the display screen.

* * * * *